United States Patent
Levitan (10) Patent No.: US 7,356,751 B1
(45) Date of Patent: Apr. 8, 2008

(54) ERROR HANDLING AND AUDIENCE MEASUREMENT IN DATACAST NETWORK WITH RETURN CHANNEL

(76) Inventor: Gutman Levitan, 101 Grove St., Apt. 11, Stamford, CT (US) 06901

(*) Notice: Subject to any disclaimer, the term of this patent is extended or adjusted under 35 U.S.C. 154(b) by 0 days.

(21) Appl. No.: 11/810,668

(22) Filed: Jun. 7, 2007

(51) Int. Cl.
- G08C 25/02 (2006.01)
- H04L 1/18 (2006.01)
- H04L 1/14 (2006.01)
- H03M 13/00 (2006.01)

(52) U.S. Cl. .................. 714/748; 714/749; 714/750; 714/751

(58) Field of Classification Search ......... 714/748–751
See application file for complete search history.

(56) References Cited

U.S. PATENT DOCUMENTS

| | | | |
|---|---|---|---|
| 6,018,519 A * | 1/2000 | Ginzboorg | 370/236 |
| 6,285,665 B1 * | 9/2001 | Chuah | 370/319 |
| 6,327,254 B1 * | 12/2001 | Chuah | 370/328 |
| 6,377,548 B1 * | 4/2002 | Chuah | 370/233 |
| 6,400,695 B1 * | 6/2002 | Chuah et al. | 370/310 |
| 6,469,991 B1 * | 10/2002 | Chuah | 370/329 |
| 6,567,416 B1 * | 5/2003 | Chuah | 370/418 |
| 6,594,240 B1 * | 7/2003 | Chuah et al. | 370/328 |
| 6,674,765 B1 * | 1/2004 | Chuah et al. | 370/458 |

* cited by examiner

*Primary Examiner*—Joseph D. Torres
(74) *Attorney, Agent, or Firm*—Ilya Zborovsky (57) ABSTRACT

A data broadcast network with a return channel providing a guaranteed error-free data delivery simultaneously to multiple receiving devices. The network transmits data in packets and uses the return channel for audience measurement and packets recovery. Whenever a corrupted packet is detected, the multiple receiving devices play a kind of "lottery game" running generators of random numbers, and only "winners" submit retransmission requests over the return channel. While in the game each receiver acts on its own, it is advised by the sender on the audience size, i.e. the overall number of receivers. It allows setting the game so to limit the number of retransmission requests to just a few and to keep it independent from the audience size. The sender performs the audience measurement by transmitting packets with wrong error-checking values and evaluating receivers' responses.

3 Claims, 5 Drawing Sheets

ERROR HANDLING AND AUDIENCE MEASUREMENT IN DATACAST NETWORK WITH RETURN CHANNEL

BACKGROUND OF THE INVENTION

This invention relates to the field of packet-switching networks and, more specifically, data broadcast networks. The Internet is the global packet-switching network and the digital television is a data broadcast network utilizing packet multiplexing.

The guaranteed error-free data delivery over the Internet is provided by an acknowledgement mechanism of TCP protocol. According to the protocol, the sender retransmits a packet if the receiver does not acknowledge the reception of the error-free packet. The positive acknowledgement or ACK provides for both packets recovery and congestion control—the sender slows down if ACKs are delayed. A "negative acknowledgement" or NAK, which is a request for retransmission of a lost or corrupted packet, is used for packets recovery only.

Cable, satellite and terrestrial television networks are using digital compression and packet multiplexing in order to increase the number of channels but as of today, they operate as one-way systems. (Though cable plant has a return channel for Internet access, video-on-demand and telephone over cable.) Accordingly, no retransmission requests are sent back to the sender; instead errors are handled by a forward error correction mechanism (FEC) which requires more redundant bits and does not provide a guaranteed error-free delivery.

Return channels may improve television in three ways providing content on demand, packets recovery and audience measurement.

While video is widely considered as error-tolerant, the very reason to pay for cable or satellite service is a better picture quality, which in turn is a result of lower error rates. Using a return channel over DSL for packets recovery may dramatically improve the quality of terrestrial broadcast television, which is free of charge.

In the television industry the audience size is determined by Nielsen Ratings provided by Nielsen Media Research. Since television as a business makes money by selling audiences to advertisers, the Nielsen Ratings are used for determining the cost of advertising spots in television programs. The ratings are gathered either by using surveys, where a viewer keeps a diary of watched programming in exchange for a fee, or by using a meter device connected in selected homes to TV set for gathering the viewing habits and transmitting the information to Nielsen through a phone line. A criticism of the system is that it fails the most important criteria of a sample: it is not random in the statistical sense because only those viewers who accept diaries or meters are included in the sample.

In a data broadcast system, each receiving device represents a user and a group of devices, which simultaneously receive or download a particular content, represents the audience of the content. With a return channel being provided the audience measurement can be automated and improved.

There is however a difference between broadcast systems and conventional computer networks. On the Internet, a separate copy of content is served to each client computer even when thousands of clients request the same content. While this delivery model wastes the network resources and creates congestion, the audience is measured simply by the number of "hits". In a data broadcast system, all receiving devices receive the same signal and therefore the same "copy" of content—and the same corrupted packet as well. So should each receiver send a retransmission request whenever it receives a corrupted packet? The answer seems to be negative because there might be thousands and even millions of recipients of the same content and just one request would be enough to recover the packet, while multiple requests would reduce the bandwidth savings of the "one copy to all" delivery. On the other hand, it is impossible to designate a particular receiver as a request sender because it is unknown in advance which receivers will make up an audience of a particular content.

This invention is a method and system for packets recovery in data broadcast network with a return channel. The system operates so that not all but only a few receivers submit requests for retransmission of a corrupted packet no matter how many receivers have received the packet. The system operations include an audience measurement on the sender side by transmitting packets with wrong error-checking values and evaluating receivers' responses. While the efficient error handling improves the network performance, the audience measurement is important for network business as long as transmitted content is funded by advertisers.

An application of this technique for error handling and audience measurement is Broadcast Modem—an Internet access system disclosed in U.S. Pat. Nos. 6,698,023, 6,965,913 and 7,092,999 by the same applicant. The system delivers Internet content in two steps. First, a single copy of content is downloaded from its origin web server into a server at a broadcast center according to the standard Internet protocol. Then the copy is transmitted to client computers according to a data broadcast protocol so that all clients could download it simultaneously. Without any change to the existent Internet infrastructure, the two-step delivery reduces congestion on web sites and routers, provides users with virtually instant access to information of common interest and facilitates delivery of full-length DVD-quality video from Web sources.

SUMMARY

Accordingly, it is an object of the present invention to provide a guaranteed error-free data delivery simultaneously to multiple receiving devices.

Another object is to provide an efficient tool for audience measurement in a data broadcast environment.

A further object is a guaranteed error-free delivery of Internet content from its origin web server simultaneously to many web clients.

A still further object is improvement of digital terrestrial television by using a return channel, e.g. via DSL, for packets recovery and audience measurement.

The novel features, which are considered as characteristic for the present invention, are set forth in particular in the appended claims. The invention itself, however, will be best understood from the following description of specific embodiment when read in connection with the accompanying drawings.

DESCRIPTION OF THE PREFERRED EMBODIMENTS

Figure 1:
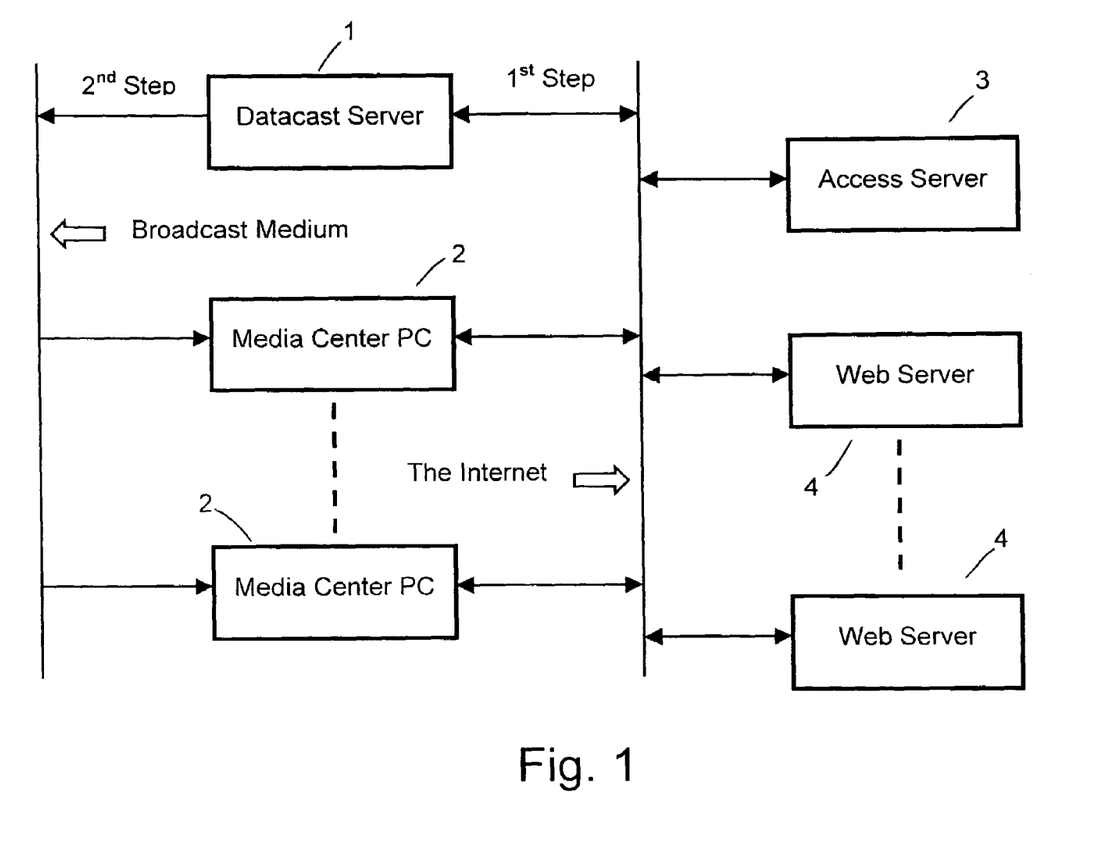
FIG. 1 is a view of a data broadcast network integrated with the Internet.

A data broadcast network integrated with the Internet is illustrated by FIG. 1. It comprises a datacast server 1 provided at a broadcast transmission center and datacast clients—media center PCs 2 located in the area serviced by the broadcast center. The datacast server and each media center PC are connected to both the Internet and a broadcast medium such as cable, satellite or digital terrestrial station. A digital content is delivered to the datacast server over the Internet or by any other means and then distributed to clients in a broadcast manner. In case of a one-way broadcast medium, such as satellite or digital terrestrial, the return channel is provided by DSL and in case of two-way cable plant, it is provided by cable modem. A two-way medium, such as FTTH (fiber to the home) or WiMAX (broadband wireless), can provide both the broadcast transmission and the return channel.

A request for a web content submitted by a client via the Internet is received by an access server 3 and forwarded to a proper datacast server. The server downloads a single copy of content from its origin web server 4 no matter how many clients have requested the content. Then the server transmits the copy over the broadcast medium so that all clients could download it simultaneously.

The two-step delivery has important advantages. If during a download of a particular content from a web server into the server at a broadcast center other clients request the same content, the datacast server will not initiate new downloads but will notify all requesters about a broadcast transmission after the content has been downloaded. That allows handling of all requests submitted during the time of delivery via the Internet as "simultaneous" and serving them with the same copy of content. In addition, a downloaded content in high demand may be retained (cached) at the broadcast center until it is updated on its origin web server or until a high demand for that content is over, thereby further reducing Internet traffic and as a result, Internet congestion and latency.

The full advantage of this access method is achieved when datacast is combined with Web caching on the client side. In a new PC, the hard disk drive can store hundreds of hours of video, millions of still pictures and billions of text and data pages. Instead of storing links in "Favored Places" of Internet Explorer, a client computer can store the content itself and automatically update it at the time of a scheduled broadcast transmission. Then the current versions of content will be permanently stored in client computers and therefore instantly available to users when requested. Although the high capacity storage is important, Web cashing on the client side is unfeasible without data broadcast because delivery of a separate copy of content to each client, whenever the content is updated on its origin server, would create a huge traffic clogging the Internet.

Figure 2:
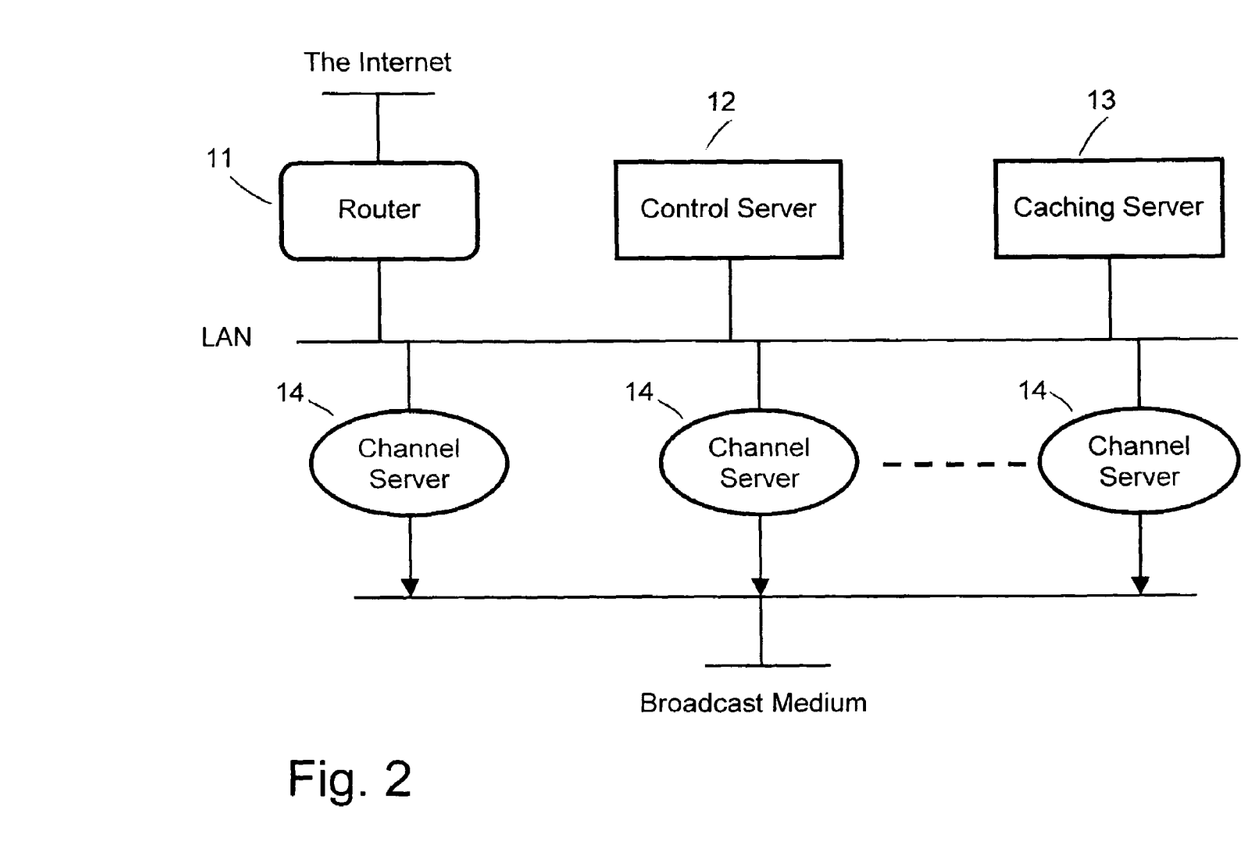
FIG. 2 is a view of the server side of data broadcast network.

The server side of the data broadcast network is illustrated by FIG. 2. It comprises a number of computers connected by a local area network (LAN), which in turn is connected to the Internet via a router 11. Functionally the computers are divided into three groups: a control server 12, a caching server 13 and channel servers 14. The control server receives clients' requests for web content and composes a list of web objects to be delivered to clients. It passes the list to the caching server that downloads objects included in the list from their origin servers connected to the Internet throughout the world. The caching server stores the downloaded objects as long as instructed by the control server. The function of a channel sever is reception of data from the caching server under the guidance of control server and forwarding the data to a broadcast channel to which the channel sever is connected.

Figure 3:
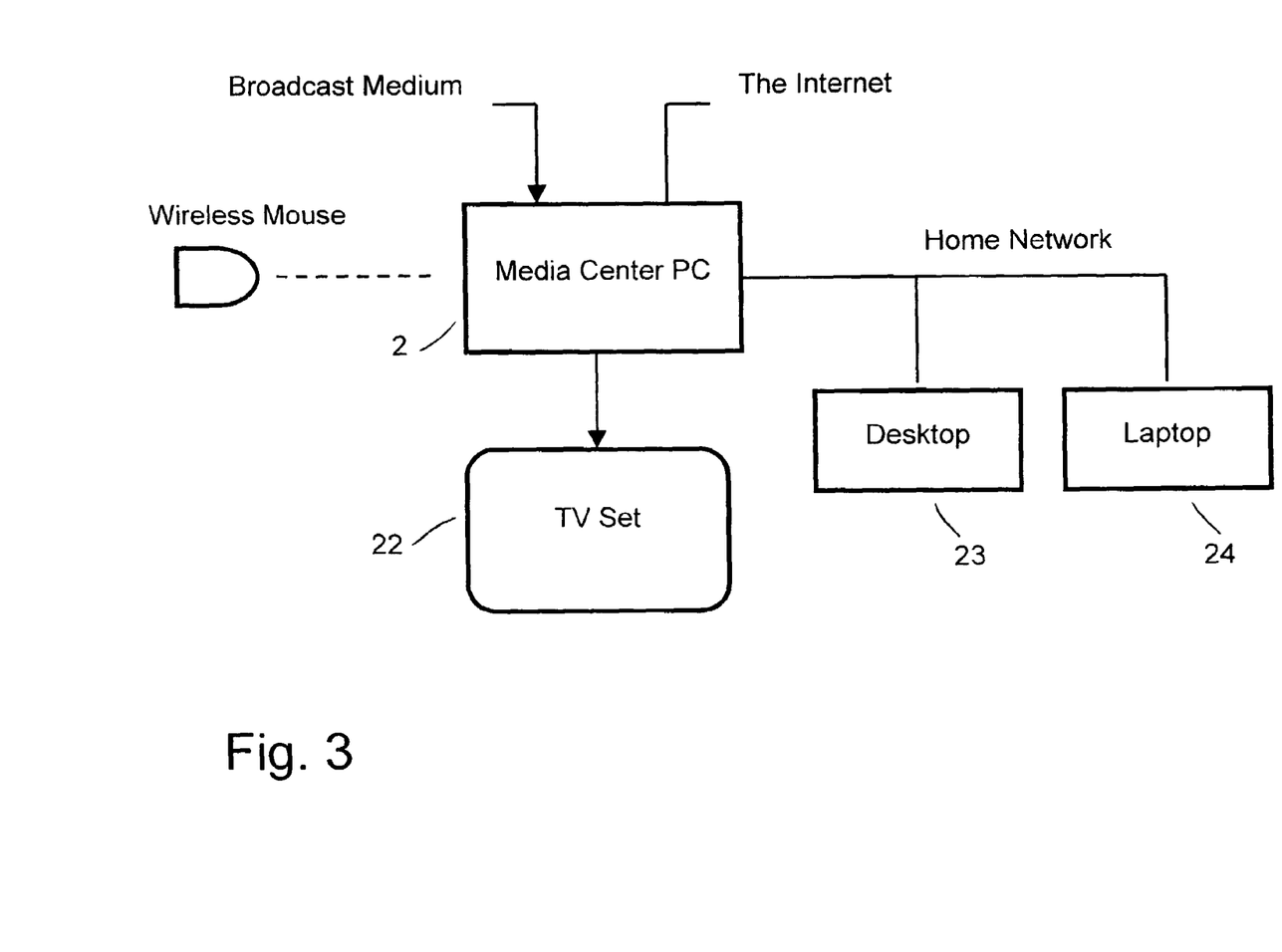
FIG. 3 is a view of the client side of data broadcast network.

On the client side illustrated by FIG. 3, a media center PC 2 is connected to both the one-way broadcast medium and the Internet. It may be further connected to a TV set 22 and over a home network, to a desktop 23 and/or a laptop 24 located anywhere in the home. As of the time of writing, media center PCs are manufactured by more than twenty companies including H/P and Sony. The multimedia computer can be connected to both television and the Internet thereby providing a platform for convergence of the two mediums.

In a conventional data communication network including the Internet, a computer receives data because the data is sent to its network address. In the combined Internet/datacast network, web content is delivered first to a datacast server according to the standard Internet protocol, known as TCP/IP, and then to client computers accordingly to a data broadcast protocol. The IP network delivers a web object as a flow of packets to a destination address included in the header of each packet. The datacast network delivers a web object also as a flow of packets but not necessarily to a particular client but to an unlimited number of clients simultaneously. To receive a content the clients need to know on which channel the content will be transmitted and, because the channel may carry many flows, a flow identity as well. For this purpose, the datacast server produces an announcement of transmission. The announcement (FIG. 4a) contains URL (Uniform Resource Locator), which identifies the content on the Web, along with a channel number and a flow number assigned to that content by the datacast server. Depending on the number of receivers, the announcement is included either in an individual notifications delivered to clients over the Internet or in a broadcast schedule transmitted over the broadcast medium.

The datacast server may direct any downloaded web object to any broadcast channel. The number of flows transmitted over a channel is variable and depends on the load: the more objects are requested by users and the larger the size of objects, the more flows are transmitted concurrently over each channel. The system is getting faster with a decreasing load and slower with an increasing load. This way it gets the most from the available bandwidth of broadcast channels in order to achieve the maximum performance.

Figure 4:
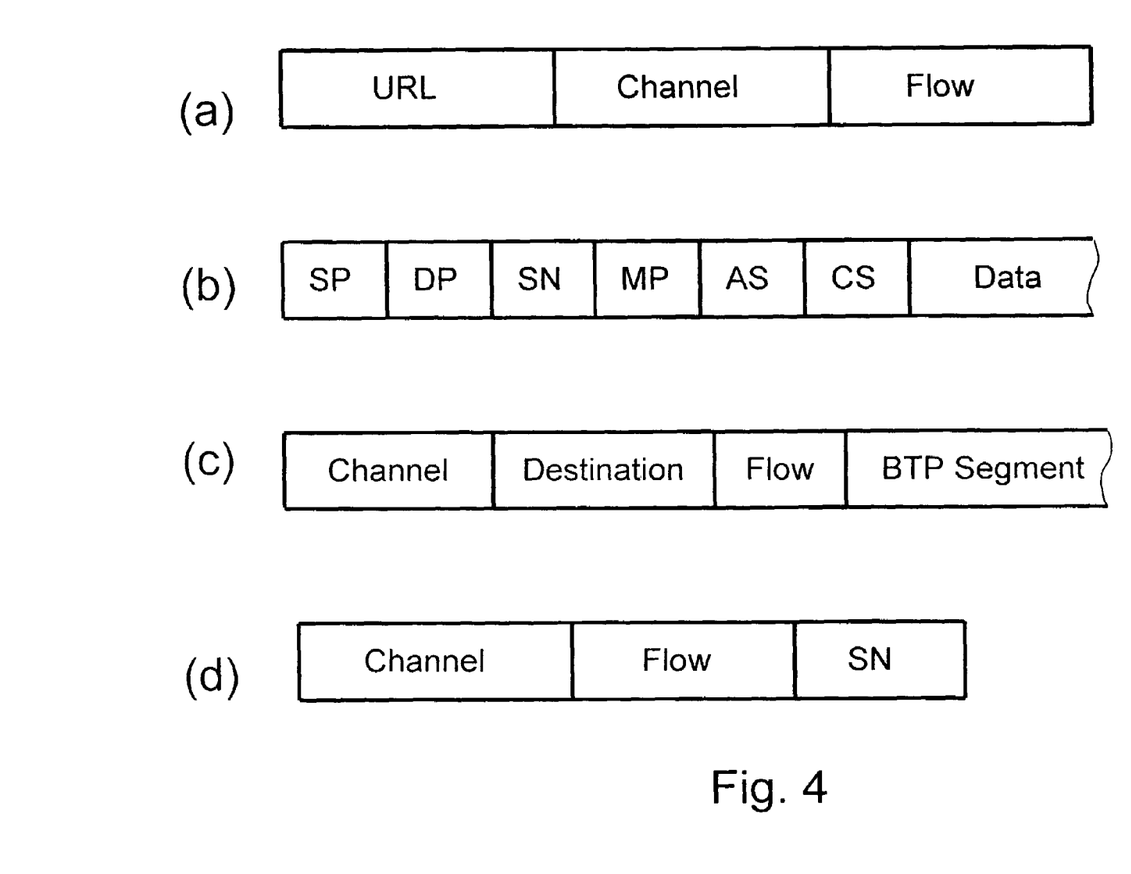
FIG. 4 is a layout of packets according to the data broadcast protocol.

Similar to the Internet protocol TCP/IP, the data broadcast protocol is split into layers: application layer, transport layer and network layer. Announcement packets and content packets of application layer are encapsulated in Broadcast Transport Protocol (BTP) segments as illustrated by FIG. 4b, which, in turn, are encapsulated in Broadcast Network Protocol (BNP) datagrams as illustrated by FIG. 4c. At the network layer, which is responsible for data delivery, the packet header specifies the packet source, the packet destination and the flow to which the packet belongs (FIG. 4c). The packet source is a channel server 14 shown in FIG. 2. The destination is either the address of a particular client or the broadcast address (all binary ones). If the destination is a particular client, the flow number is null (all binary zeroes).

The transport layer protocol, which is TCP in the case of the Internet, is responsible for data exchange between applications run on different computers. In particular, TCP provides a flow control and a reliable data delivery. In the data broadcast network, the flow control is a function of control server 12 shown in FIG. 2 and the guaranteed error-free data delivery is a function of BTP. The header of BTP segment, as illustrated by FIG. 4b, comprises the following fields: a source port SP, a destination port DP, a packet sequence number SN, a more packets indicator MP, an audience size estimate AS and a checksum CS. All but AS fields are similar to those in TCP protocol and only three fields—the sequence number, the checksum and the audience size—are relevant to the reliable data delivery.

A checksum, such as cyclic redundancy check (CRC), is a bit sequence appended to a block of data as an error-checking value. The sending computer calculates CRC so that a resulting block would be exactly divisible by a predetermined number. The receiving computer divides the block by the predetermined number and if there is a remainder, the data is considered corrupted and a request for packet retransmission needs to be sent back to the server. The request, as illustrated by FIG. 4d, specifies a channel, a flow and a packet sequence number. CRC is used for detecting accidental data modification in a communication channel caused by electrostatic impulses in the atmosphere, attenuation of the signal in a cable and so on. To provide security against a malicious modification, the use of a cryptographic hash function, such as SHA-256, is necessary.

In a data broadcast system, each client computer represents a user and a group of client computers, which simultaneously download a particular content, represents the audience of the content. There is however an essential difference between a broadcast systems and a conventional computer network. On the Internet, which is a global computer network, a separate copy of content is served to each client even when thousands of clients request the same content. In a data broadcast system, all clients receive the same signal and therefore the same "copy" of content, which is good, but also the same corrupted packet, which is a problem if a guaranteed error-free delivery is required. On one hand, it would be wrong for each client to submit its own retransmission request because one request on behalf of all would be enough. Multiple requests would reduce the bandwidth savings of "one copy to all" delivery, especially in the view of the fact that both cable and DSL have less bandwidth in the client to server (upstream) direction than in the server to client (downstream) direction. On the other hand, it is impossible to designate a particular client as a requester because it is unknown in advance which clients will make up an audience of a particular content. The solution of this invention is making clients to play a kind of "lottery game" running generators of random numbers so that only "winners" would submit requests. As a result, only a few clients submit retransmission requests on behalf of all.

The earliest applications of randomness—coin flipping, dice and roulette are still used today, mainly in gambling. Other applications include statistical simulations, cryptography, video games, and searching and sorting algorithms.

In the early Ethernet, randomness is used for collision recovery. Collisions occur regularly in a normally operating Ethernet network when two stations attempt to transmit at the same time. In such a case, the stations must back off, wait a random time and try again. They are using a Truncated Binary Exponential Backoff Algorithm to avoid another collision.

Different applications led to many different methods for generating random numbers. These methods may vary as to how unpredictable or statistically random the numbers are, and how quickly they can be generated. Physical methods, which produce true random numbers outside the computer environment, are based on the theory of entropy. Sources of entropy include nuclear decay and atmospheric conditions. Computational methods produce pseudo-random numbers, i.e. a sequence of numbers with random properties, but eventually the sequence repeats. Any major programming language includes a random number generator as a function in its library but it is not necessarily fit this application, which is a kind of statistical simulation. When the audience size is measured in millions or tens of millions, the client computers have to generate very long sequences with good statistical properties. Linear congruential generators (LCGs) represent one of the oldest and best-known pseudo-random algorithms but their properties are far from ideal. Apparently Mersenne Twister developed in 1997 by Makoto Matsumoto and Takuji Nisimura is the random number generator of choice because it is fast, designed specifically for statistical simulations and freely available. Mersenne Twister MT19937 has a colossal period of $2^{19937}-1$ (in decimal $4.315425 \times 10^{6001}$) and a negligible correlation between successive values in the output sequence.

In the preferred embodiment, all client computers run the same type of generator but to different positions, which are defined by their different network addresses or account numbers, and select the last random number found in that position. If all numbers in the range of generated numbers are equally probable and there is no correlation between successive values in the generated sequence then the numbers found in different positions of the sequence may be considered as results of independent trials. The number of retransmission requests submitted by clients may be evaluated according to Poisson distribution, which is used in statistics for predicting the number of occurrences of an event in a series of trials. Let us assume that the audience size (the number of trials) is N and the range of generated numbers is 1 to M. Then the probability p of any particular result, for example M, in each trial is 1/M. According to Poisson distribution, the probability of k occurrences of the result in N trials, and therefore the probability of k retransmission requests, will be:

$$f(k; \lambda) = \frac{e^{-\lambda} \lambda^k}{k!},$$

where e is the base of the natural logarithm (e=2.71828 . . . ), k! is the factorial of k, $\lambda$ is equal Np and therefore N/M.

Figure 5:
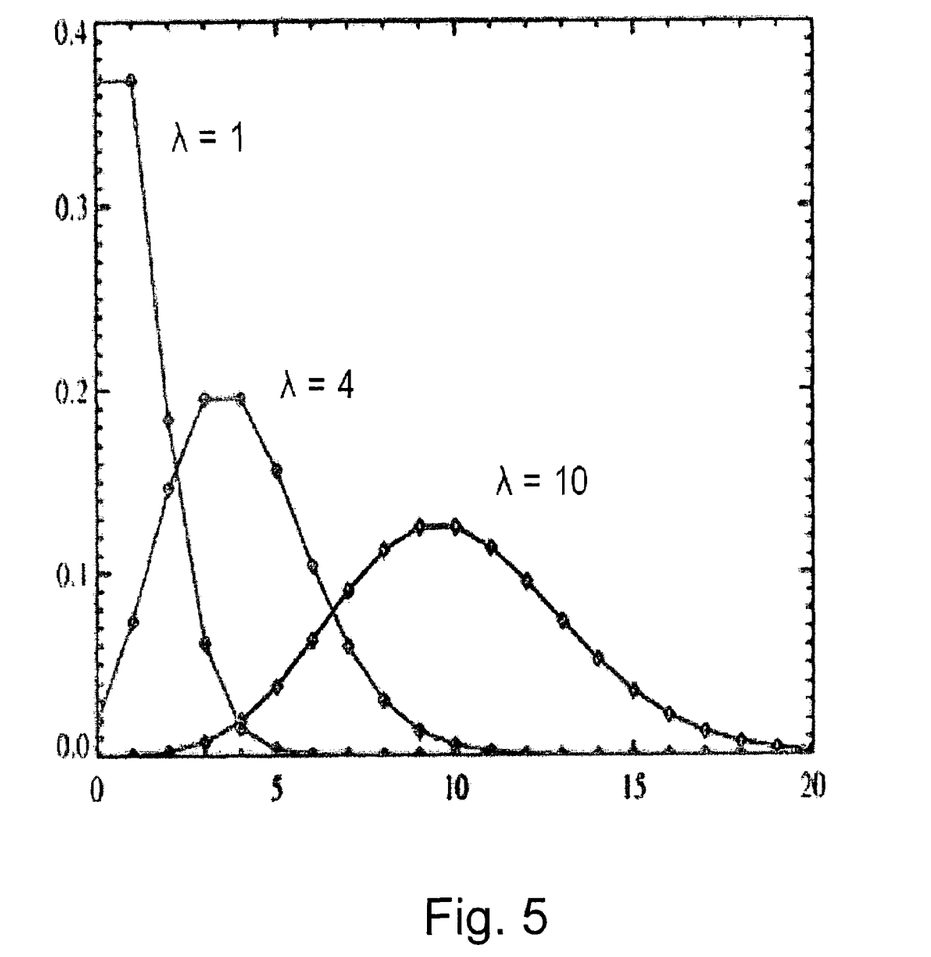
FIG. 5 shows statistics of retransmission requests.

The statistics of expected retransmission requests according to the Poisson distribution is illustrated by FIG. 5. The probability of exactly k requests is defined only for integer values of k—the connecting lines are guides for the eye and do not indicate continuity. For the distribution, the parameter $\lambda$ is the mean and also the variance, that is $\lambda = \sigma^2$ where $\sigma$ is the standard deviation. In other words, the average number of occurrences is $\lambda$ and the maximum number of occurrences is $\lambda + 3\sigma$ or $\lambda + 3\lambda^{1/2}$. And because $\lambda$ is the ratio of the audience size N to the range of generated numbers M, the average number of retransmission requests submitted by client computers will be $$k_{avg} = N/M$$

while the maximum number will not exceed $$k_{max}=N/M+3(N/M)^{1/2}$$

Thus both $k_{avg}$ and $k_{max}$ depend on the ratio of audience size to the range of generated numbers and therefore for any audience size the range can be chosen so to confine the number of requests. In the case of λ=1, that is when the range of generated numbers equals the audience size, the average number of requests is 1 and the maximum number is 4. However the probability of k=0 is 0.37, which is unacceptable because at least one client has to submit a retransmission request on behalf of all. Therefore the range of generated random numbers has to be less than the audience size although it increases the number of requests. In the case of λ=4, the average number of requests is 4, the maximum number is 10 and the probability of k=0 is 0.018, which although small, does not exclude the possibility that a retransmission request will not be submitted. In the case of λ=10, the average number of requests is 10, the maximum number is 19 and the probability of k=0 is 0.00005.

If after a certain time a client computer has not received an error-free packet to replace a corrupted packet, it continues to run the generator of random numbers and so do all other clients. For the ratio λ=4, the probability of k=0 in two runs is 0.0003. This may be recommended for a not real-time transmission when delays in packet delivery are acceptable. For a real-time transmission, the ratio λ=10 is preferable. It is possible that because of different conditions in different parts of the servicing area not all but only some clients receive a corrupted packet. To deal with this, a client that has not received an error-free packet after a certain extended time runs a generator with a reduced range of random numbers and eventually may submit a retransmission request.

The error-handling technique is using audience size to set properly the random number generators run by client computers. The evaluation of audience size is also important for the network business as long as transmitted content is funded by advertisers. For audience measurement the datacast server repeatedly transmits a packet with a wrong checksum CS (see FIG. 4b) followed by a packet with the same sequence number SN and the right checksum, and evaluates clients responses in between. In the preferred embodiment both packets have no payload and thus do not contribute data to the reassembled data object. In the audience size field AS the server includes a preliminary estimate of audience size N or the value M=N/A, where 1 to M is the range of random numbers to be generated by client computers. The server counts retransmission requests submitted by clients and evaluates actual counts k against counts that are expected according to Poisson distribution illustrated by FIG. 5. If the actual counts are greater than expected, the server increases the audience size estimate and if the actual counts are lesser than expected it reduces the estimate. The server accepts an estimate as the correct one when actual counts k are consistent with the theoretical probability distribution. Audience measurement is performed at the start of data object transmission and if the transmission is long, as in the case of a movie or television show, the measurement may be repeated in the middle. The server continues to monitor retransmission requests caused by natural transmission errors and performs a new audience measurement when the average number of requests $k_{avg}$ and/or the maximum number $k_{max}$ become inconsistent with those defined by the theoretical probability distribution.

The Poisson distribution is an approximation of a cumbersome binomial distribution when the number of trials N is sufficiently large and the probability p of an event is sufficiently small. As a rule of thumb, the Poisson distribution is a good approximation if N is at least 20 and p is smaller than or equal to 0.05. Because p=1/M, the range of generated random numbers has to be at least 1 to 20 and audience size at least 80 for a not real time-transmission (λ=4) and at least 200 for a real-time transmission (λ=10). The binomial distribution is supposed to be used for evaluation of smaller audiences but its computing is simpler for lesser N and M.

Although the invention is described herein with reference to the preferred embodiment, it is to be understood that modifications can be made by those skilled in the art without departing from the spirit or scope of the invention. In particular, instead of a media center PC the datacast client may be any computer with an internal or external tuner. It also may be a set-top box or a portable device. Accordingly, the invention should only be limited by the claims included below.

I claim:

1. A method of error handling in a data broadcast network with a return channel wherein a content is transmitted as a flow of packets, comprising the steps of:
   at the sending end,
   including an estimate of audience size of a content in packets of the content, wherein the audience size is the number of devices that are receiving the content;
   providing each packet with an error-checking value;
   receiving over a return channel requests for retransmission of packets; and
   retransmitting a packet whenever at least one request for retransmission of that packet is received;
   at the receiving end,
   verifying each received packet using said error-checking value;
   whenever an error is detected in a packet,
   reading said estimate of the audience size included in the packet;
   generating a random number within a range of numbers wherein the range is a function of the audience size; and
   submitting over a return channel a request for retransmission of the packet only if a particular predetermined number was generated;
   thereby reducing an overall volume of retransmission requests submitted over the return channel and keeping the volume independent from the audience size.

2. A system for error handling in a data broadcast network with a return channel wherein a content is transmitted as a flow of packets, comprising:
   at the sending end,
   means for including an estimate of audience size of a content in packets of the content, wherein the audience size is the number of devices that are receiving the content;
   means for providing each packet with an error checking value; and
   retransmission means for receiving retransmission requests over a return channel and being operative for retransmission of a packet whenever at least one request for retransmission of that packet is received;
   at the receiving end,
   verification means for verifying each received packet using said error-checking value and whenever an error is detected, reading said estimate of audience size included in the packet;

a random number generator coupled with the verification means for obtaining the estimate of the audience size and being operative for generating random numbers within a range of numbers wherein the range is a function of the audience size; and recovery means coupled with said verification means for identifying corrupted packets and with said random number generator for obtaining generated numbers, said recovery means being operative for submitting over a return channel a request for retransmission of a corrupted packet only if a particular predetermined number was generated; thereby reducing an overall volume of retransmission requests submitted over the return channel and keeping the volume independent from the audience size.

3. The system of claim 2, wherein said random number generator and said recovery means are further operative for reducing the range of generated numbers and eventually submitting a retransmission request if during a certain time an error-free packet for replacement of a corrupted packet has not been received.

* * * * *